US011815468B2

(12) United States Patent
Kuno et al.

(10) Patent No.: US 11,815,468 B2
(45) Date of Patent: Nov. 14, 2023

(54) IMAGE RESTORATION APPARATUS, IMAGE RESTORATION METHOD, IMAGE RESTORATION PROGRAM, RESTORER GENERATION APPARATUS, RESTORER GENERATION METHOD, RESTORER GENERATION PROGRAM, DETERMINER GENERATION APPARATUS, DETERMINER GENERATION METHOD, DETERMINER GENERATION PROGRAM, ARTICLE DETERMINATION APPARATUS, ARTICLE DETERMINATION METHOD, AND ARTICLE DETERMINATION PROGRAM

(71) Applicant: AISIN CORPORATION, Kariya (JP)

(72) Inventors: Yasuyuki Kuno, Kariya (JP); Yukio Ichikawa, Kariya (JP); Masataka Toda, Kariya (JP); Masaru Hisanaga, Kariya (JP); Norihiro Miwa, Kariya (JP); Jin Nozawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 436 days.

(21) Appl. No.: 17/015,725

(22) Filed: Sep. 9, 2020

(65) Prior Publication Data
US 2021/0080400 A1 Mar. 18, 2021

(30) Foreign Application Priority Data
Sep. 12, 2019 (JP) .................. 2019-166662

(51) Int. Cl.
*G06T 7/00* (2017.01)
*G01N 21/88* (2006.01)
*G06N 20/00* (2019.01)

(52) U.S. Cl.
CPC ......... *G01N 21/8851* (2013.01); *G06N 20/00* (2019.01); *G06T 7/0004* (2013.01);
(Continued)

(58) Field of Classification Search
CPC .......... G06N 3/08; G06N 3/045; G06N 20/00; G06N 3/084; G06N 3/04; G06N 3/047;
(Continued)

(56) References Cited

U.S. PATENT DOCUMENTS 8,594,375 B1 * 11/2013 Padwick ............... G06T 7/0008
382/103
11,386,538 B2 7/2022 Yoshida
(Continued)

FOREIGN PATENT DOCUMENTS

CN 102646267 A * 8/2012
CN 104919490 A * 9/2015 ............... G06T 5/00
(Continued)

OTHER PUBLICATIONS

Guilin Liu et al., "Image Inpainting for Irregular Holes Using Partial Convolutions", NVIDIA Corporation, Dec. 2018.

*Primary Examiner* — Michael P Stafira
(74) *Attorney, Agent, or Firm* — Sughrue Mion, PLLC

(57) ABSTRACT

An image restoration apparatus includes: an image acquisition unit that acquires a mask image generated by masking, by a mask region, a predetermined region of an article image in which an article is imaged; and an image output unit that outputs a restored image corresponding to the mask image acquired by the image acquisition unit by using a restorer pre-trained by machine learning so as to output the restored image, which is restored from the mask image to reproduce the article image in a pseudo manner, according to an input of the mask image.

7 Claims, 8 Drawing Sheets

(52) U.S. Cl.
CPC .............. *G01N 2021/8854* (2013.01); *G01N 2021/8887* (2013.01); *G06T 2207/20081* (2013.01)

(58) Field of Classification Search
CPC ........ G06N 3/088; G06N 3/049; G06N 3/063; G06N 3/02; G06N 7/01; G06N 20/20; G06N 3/044; G06N 5/01; G06N 5/046; G06N 3/006; G06N 5/02; G06N 3/0455; G06N 3/048; G06N 3/082; G06N 3/09; G06T 2207/20084; G06T 2207/20081; G06T 7/11; G06T 11/00; G06T 7/0004; G06T 7/0012; G06T 2207/30252; G06T 17/05; G06T 2207/20076; G06T 15/00; G06T 5/005; G06T 7/00; G06T 7/12; G06T 2207/10024; G06T 2207/10028; G06T 2207/20021; G06T 7/10; G06T 1/20; G06T 1/60; G06T 2207/10016; G06T 2207/10041; G06T 2207/20132; G06T 2207/30024; G06T 2207/30136; G06T 2207/30156; G06T 2207/30164; G06T 2207/30181; G06T 2207/30232; G06T 2207/30241; G06T 2207/30248; G06T 7/0002; G06T 7/0008; G06T 7/001; G06T 7/0016; G06T 7/55; G06T 7/70; G06T 9/002; G06T 11/003; G06T 11/60; G06T 13/40; G06T 15/005; G06T 15/04; G06T 15/10; G06T 15/40; G06T 15/405; G06T 17/10; G06T 17/20; G06T 17/30; G06T 2200/28; G06T 2207/10048; G06T 2207/10101; G06T 2207/20004; G06T 2207/30041; G06T 2207/30048; G06T 2207/30096; G06T 2207/30101; G06T 2207/30141; G06T 2219/2004; G06T 3/0006; G06T 3/0012; G06T 5/50; G06T 7/194; G06T 7/20; G06T 1/00; G06T 11/001; G06T 2207/10004; G06T 2207/10056; G06T 2207/10064; G06T 2207/10068; G06T 2207/10072; G06T 2207/10081; G06T 2207/10092; G06T 2207/10132; G06T 2207/20056; G06T 2207/20104; G06T 2207/20221; G06T 2207/30004; G06T 2207/30016; G06T 2207/30168; G06T 2207/30196; G06T 2207/30201; G06T 2207/30242; G06T 2210/12; G06T 3/602; G06T 5/00; G06T 5/002; G06T 5/003; G06T 5/20; G06T 5/40; G06T 7/162; G06T 7/181; G06T 7/187; G06T 7/246; G06T 7/30; G06T 7/521; G06T 7/73; G06T 7/90; G01N 2021/8854; G01N 2021/8887; G01N 21/8851; G01N 2021/9583; G01N 21/8806; G01N 21/94; G01N 21/958; G01N 23/04; G01N 2440/00; G01N 33/48721; G01N 33/6824

See application file for complete search history.

(56) References Cited

U.S. PATENT DOCUMENTS

| | | | | |
|---|---|---|---|---|
| 2012/0313937 | A1* | 12/2012 | Beeler | G06T 19/00 345/419 |
| 2016/0125273 | A1* | 5/2016 | Matsunaga | G06F 18/2411 382/159 |
| 2016/0189357 | A1* | 6/2016 | Shibata | G06V 30/2504 382/197 |
| 2018/0293721 | A1* | 10/2018 | Gupta | G01N 21/95607 |
| 2020/0312007 | A1* | 10/2020 | Liu | G06N 3/08 |
| 2021/0118118 | A1 | 4/2021 | Yoshida | |

FOREIGN PATENT DOCUMENTS

| | | | | |
|---|---|---|---|---|
| CN | 108109116 | A * | 6/2018 | |
| CN | 108648133 | A * | 10/2018 | ............... G06T 1/00 |
| CN | 109791687 | A * | 5/2019 | ............... G06T 19/20 |
| CN | 110060216 | A * | 7/2019 | |
| JP | 08-096136 | A | 4/1996 | |
| JP | 3315766 | B2 * | 8/2002 | ............... G11B 27/28 |
| JP | 2005156334 | A * | 6/2005 | |
| JP | 2018503906 | A * | 8/2018 | |
| KR | 100927236 | B1 * | 11/2009 | |
| WO | WO-2019117065 | A1 * | 6/2019 | ............... G06T 7/00 |
| WO | 2019/146538 | A1 | 8/2019 | |

\* cited by examiner

IMAGE RESTORATION APPARATUS, IMAGE RESTORATION METHOD, IMAGE RESTORATION PROGRAM, RESTORER GENERATION APPARATUS, RESTORER GENERATION METHOD, RESTORER GENERATION PROGRAM, DETERMINER GENERATION APPARATUS, DETERMINER GENERATION METHOD, DETERMINER GENERATION PROGRAM, ARTICLE DETERMINATION APPARATUS, ARTICLE DETERMINATION METHOD, AND ARTICLE DETERMINATION PROGRAM

CROSS REFERENCE TO RELATED APPLICATIONS

This application is based on and claims priority under 35 U.S.C. § 119 to Japanese Patent Application 2019-166662, filed on Sep. 12, 2019, the entire content of which is incorporated herein by reference.

TECHNICAL FIELD

This disclosure relates to an image restoration apparatus, an image restoration method, an image restoration program, a restorer generation apparatus, a restorer generation method, a restorer generation program, a determiner generation apparatus, a determiner generation method, a determiner generation program, an article determination apparatus, an article determination method, and an article determination program.

BACKGROUND DISCUSSION

In the related art, there is a technique that determines presence or absence of a defect in a welded portion is determined by using neural network pre-trained by machine learning so as to output a determination result of the presence or absence of the defect in the welded portion according to an input of an image in which the welded portion is imaged.

An example of the related art includes JP H08-96136 (Reference 1).

Generally, in order to improve accuracy of the determination using the neural network as described above, it is necessary to prepare a large number of learning images for the neural network. However, it may not be easy to prepare a large number of learning images.

For example, in order to learn the neural network for determining the presence or absence of the defect in the welded portion as described above, it is necessary to prepare a large number of various images in which various defects are imaged. However, it is not easy to prepare a large number of images corresponding to defects that infrequently occur.

A need thus exists for an image restoration apparatus, an image restoration method, and an image restoration program which are not susceptible to the drawback mentioned above.

SUMMARY

An image restoration apparatus as an example of the present disclosure includes: an image acquisition unit that acquires a mask image generated by masking, by a mask region, a predetermined region of an article image in which an article is imaged; and an image output unit that outputs a restored image corresponding to the mask image acquired by the image acquisition unit by using a restorer pre-trained by machine learning so as to output the restored image, which is restored from the mask image to reproduce the article image in a pseudo manner, according to an input of the mask image.

An image restoration method as another example of the present disclosure includes: an image acquisition step of acquiring a mask image generated by masking, by a mask region, a predetermined region of an article image in which an article is imaged; and an image output step of outputting a restored image corresponding to the mask image acquired by the image acquisition step by using a restorer pre-trained by machine learning so as to output the restored image, which is restored from the mask image, according to an input of the mask image to reproduce the article image in a pseudo manner.

A non-transitory computer readable storage medium as still another example of the present disclosure stores an image restoration program for causing a computer to execute: an image acquisition step of acquiring a mask image generated by masking, by a mask region, a predetermined region of an article image in which an article is imaged; and an image output step of outputting a restored image corresponding to the mask image acquired by the image acquisition step by using a restorer pre-trained by machine learning so as to output the restored image, which is restored from the mask image, according to an input of the mask image to reproduce the article image in a pseudo manner.

A restorer generation apparatus as still another example of the present disclosure includes: an image acquisition unit that acquires a mask image generated by masking, by a mask region, a predetermined region of an article image in which an article is imaged; and a learning execution unit that generates a restorer that outputs a restored image, which is restored from the mask image, according to an input of the mask image, to reproduce the article image in a pseudo manner by executing training by machine learning based on the mask image acquired by the image acquisition unit and the article image that is a source of the mask image.

A restorer generation method as still another example of the present disclosure includes: an image acquisition step of acquiring a mask image generated by masking, by a mask region, a predetermined region of an article image in which an article is imaged; and a learning execution step of generating a restorer that outputs a restored image, which is restored from the mask image, according to an input of the mask image, to reproduce the article image in a pseudo manner by executing training by machine learning based on the mask image that is acquired by the image acquisition step and the article image that is a source of the mask image.

A non-transitory computer readable storage medium as still another example of the present disclosure stores a restorer generation program for causing a computer to execute: an image acquisition step of acquiring a mask image generated by masking, by a mask region, a predetermined region of an article image in which an article is imaged; and a learning execution step of generating a restorer that outputs a restored image, which is restored from the mask image, according to an input of the mask image, to reproduce the article image in a pseudo manner by executing training by machine learning based on the mask image that is acquired by the image acquisition step and the article image that is a source of the mask image.

A determiner generation apparatus as still another example of the present disclosure includes: an image acquisition unit that acquires a learning image including a restored image and an article image, the restored image being obtained by using a restorer pre-trained by machine learning so as to output the restored image restored from a mask image to reproduce the article image in a pseudo manner according to an input of the mask image generated by masking, by a mask region, a predetermined region of the article image in which an article is imaged; and a learning execution unit that executes training by machine learning based on the learning image acquired by the image acquisition unit, and generates a determiner that outputs a determination result regarding the article imaged in the article image according to an input of the article image.

A determiner generation method as still another example of the present disclosure includes: an image acquisition step of acquiring a learning image including a restored image and an article image, the restored image being obtained by using a restorer pre-trained by machine learning so as to output the restored image restored from a mask image to reproduce the article image in a pseudo manner according to an input of the mask image generated by masking, by a mask region, a predetermined region of the article image in which an article is imaged; and a learning execution step of executing training by machine learning based on the learning image acquired by the image acquisition step, and generating a determiner that outputs a determination result regarding the article imaged in the article image according to an input of the article image.

A non-transitory computer readable storage medium as still another example of the present disclosure stores a determiner generation program for causing a computer to execute: an image acquisition step of acquiring a learning image including a restored image obtained by using a restorer pre-trained by machine learning and an article image, so as to output the restored image restored from a mask image to reproduce the article image in a pseudo manner according to an input of the mask image generated by masking, by a mask region, a predetermined region of the article image in which an article is imaged; and a learning execution step of executing training by machine learning based on the learning image acquired by the image acquisition step, and generating a determiner that outputs a determination result regarding the article imaged in the article image according to an input of the article image.

An article determination apparatus as still another example of the present disclosure includes: an image acquisition unit that acquires an article image in which an article is imaged; and a determination output unit that outputs a determination result regarding the article imaged in the article image acquired by the image acquisition unit by using a determiner pre-trained so as to output the determination result regarding the article which is imaged in the article image according to an input of the article image by machine learning based on a learning image including a restored image obtained by using a restorer pre-trained by machine learning and the article image, so as to output the restored image, which is restored from a mask image, to reproduce the article image in a pseudo manner according to an input of the mask image generated by masking, by a mask region, a predetermined region of the article image.

An article determination method as still another example of the present disclosure includes: an image acquisition step of acquiring an article image in which an article is imaged; and a determination output step of outputting a determination result regarding the article imaged in the article image acquired by the image acquisition step by using a determiner pre-trained so as to output the determination result regarding the article which is imaged in the article image according to an input of the article image by machine learning based on a learning image including a restored image obtained by using a restorer pre-trained by machine learning and the article image, so as to output the restored image, which is restored from a mask image, to reproduce the article image in a pseudo manner according to an input of the mask image generated by masking, by a mask region, a predetermined region of the article image.

A storage medium non-transitory computer readable as still another example of the present disclosure stores an article determination program for causing a computer to execute: an image acquisition step of acquiring an article image in which an article is imaged; and a determination output step of outputting a determination result regarding the article imaged in the article image acquired by the image acquisition step by using a determiner pre-trained so as to output the determination result regarding the article which is imaged in the article image according to an input of the article image by machine learning based on a learning image including a restored image obtained by using a restorer pre-trained by machine learning and an article image, so as to output a restored image, which is restored from the mask image, to reproduce the article image in a pseudo manner according to an input of the mask image generated by masking, by a mask region, a predetermined region of the article image.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of the present disclosure will be described below with reference to the drawings. Configurations of the embodiments described below, and operations and effects produced by the configurations are merely examples, and the present disclosure is not limited to the description below.

<Image Restoration Apparatus>

In the related art, there is a technique that determines presence or absence of a defect in a welded portion by using a neural network pre-trained by machine learning so as to output a determination result of the presence or absence of the defect in the welded portion according to an input of an image in which the welded portion is imaged.

Generally, in order to improve the accuracy of the determination using the neural network as described above, it is necessary to prepare a large number of learning images of the neural network. However, it may not be easy to prepare a large number of learning images.

For example, in order to learn the neural network for determining the presence or absence of the defect in the welded portion as described above, it is necessary to prepare a large number of various images in which various defects are imaged. However, it is not easy to prepare a large number of images corresponding to defects that infrequently occur.

Therefore, the embodiment realizes that the number of images usable for machine learning is easily increased by an image restoration apparatus 100 having functions illustrated in FIG. 1 described below.

In the following, an example will be described in which the technique of the embodiment is realized as a technique for determining the presence or absence of the defect in the article including the welded portion. However, it can also be used to determine, for example, the presence or absence of various abnormalities unrelated to welding, which may occur during the manufacture of processed products, such as crimp marks, steps, blow holes, and wrinkles. Further, the technique of the embodiment can be used for determination required in another technical field, such as determination whether or not a logo mark attached to, for example, an exterior of a product indicates a genuine product.

Figure 1:
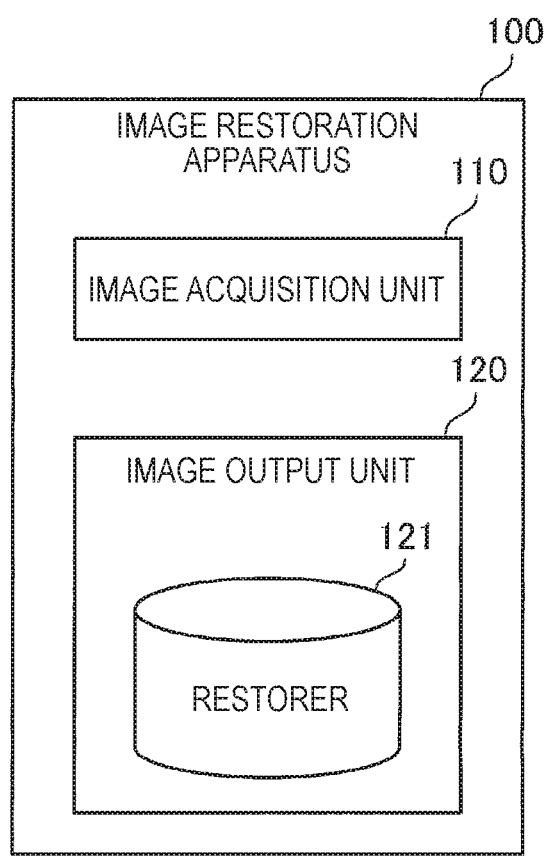
FIG. 1 is an exemplary and schematic block diagram illustrating functions of an image restoration apparatus according to an embodiment.

FIG. 1 is an exemplary and schematic block diagram illustrating the functions of the image restoration apparatus 100 according to the embodiment. As illustrated in FIG. 1, the image restoration apparatus 100 according to the embodiment includes an image acquisition unit 110 and an image output unit 120.

The image acquisition unit 110 acquires a mask image generated by masking, by a mask region, a predetermined region of the article image in which the article is imaged. More specifically, the image acquisition unit 110 acquires, as the mask image, a non-defective article mask image generated by masking, as a predetermined region, a defect candidate region predetermined so as to correspond to a portion of the article in which a defect frequently occurs during manufacturing in a non-defective article image that is an article image in which an article including no defect is imaged.

The image acquisition unit 110 acquires the mask image described above by synthesizing an article image and a template image including the mask region at a predetermined position by an image synthesizer 230 (see FIG. 2) which is described later. That is, the image acquisition unit 110 acquires a non-defective article mask image by synthesizing the non-defective article image and the template image including, as the mask region, the defect candidate region predetermined so as to correspond to a portion of an article in which the defect frequently occurs during manufacturing.

The image output unit 120 has a restorer 121 which is a learned model such as the neural network pre-trained by machine learning so as to output a restored image restored from the mask image according to the input of the mask image to reproduce the article image in a pseudo manner. The image output unit 120 outputs the restored image corresponding to the mask image acquired by the image acquisition unit 110 by using the restorer 121.

More specifically, the restorer 121 is a learned model which is pre-trained by machine learning based on a defective article image and a defective article mask image, as a mask image, generated by masking, as a predetermined region, the defective region corresponding to a defect in the defective article image so as to output, as a restored image, a pseudo-defective article image restored to reproduce a defective article image in a pseudo manner, which is an article image in which an article including a defect is imaged. The image output unit 120 outputs the pseudo-defective article image corresponding to the non-defective article mask image acquired by the image acquisition unit 110 by using the restorer 121.

According to the configuration described above, even in a case where it is difficult to acquire an actual defective article image, it is possible to mass-produce pseudo-defective article images in the same manner as the defective article image based on the non-defective article image that is easy to acquire. Therefore, according to the image restoration apparatus 100 according to the embodiment, it is possible to easily increase the number of images used for the machine learning for generating the learned model for determining the presence or absence of the defect of the article, which is executed by a determiner generation apparatus 800 (see FIG. 8) described later.

In the embodiment, the image acquisition unit 110 is configured to increase the number of non-defective article mask images by executing a first image process including at least expansion or contraction on the mask region (that is, a template image which is a source of the non-defective article mask image). In addition, the image acquisition unit 110 is configured to increase the number of non-defective article mask images by executing a second image process including one or more of noise addition, gain adjustment, contrast adjustment, and averaging on a region (that is, the non-defective article image which is a source of the non-defective article mask image) other than the mask region in the non-defective article mask image. According to such a configuration, it is possible to easily increase the number of non-defective article mask images that are the source of the images used for the machine learning for generating the determiner generation apparatus 800 (see FIG. 8) described later.

Figure 2:
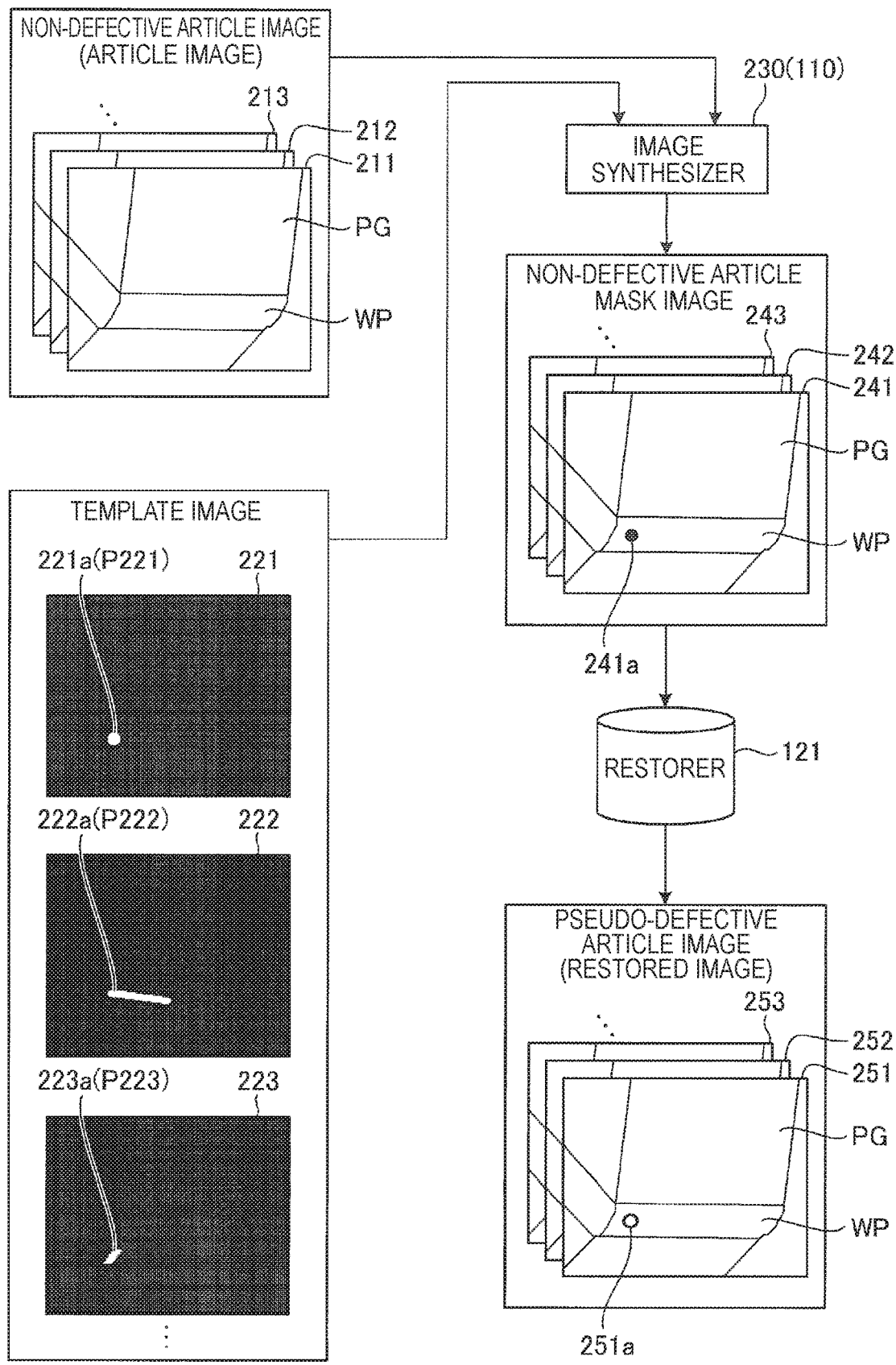
FIG. 2 is an exemplary and schematic diagram for more specifically explaining an image used for generating a pseudo-defective article image according to an embodiment.

FIG. 2 is an exemplary and schematic diagram for more specifically explaining an image used for generating a pseudo-defective article image according to the embodiment. As briefly described above, as illustrated in FIG. 2, in the embodiment, the pseudo-defective article image is generated according to the input of the non-defective article mask image to the restorer 121. In addition, the non-defective article mask image is generated according to the input of the non-defective article image and the template image to the image synthesizer 230.

In the example illustrated in FIG. 2, the non-defective article image includes a plurality of images 211, 212, 213, . . . . The image 211 is an image in which an article PG including no defect in a welded portion WP is imaged. Although details are omitted in the example illustrated in FIG. 2, similar to the image 211, images 212 and 213 are images in which the article PG including no defect in the welded portion WP is imaged. The article PG imaged on the images 212 and 213 may or may not match the article PG imaged in the image 211. In a case where the article PG imaged in the images 212 and 213, and the article PG imaged in the image 211 match each other, if imaging manners of the welded portions WP in the respective images are different, it is possible to secure diversity. Further, as described above, the images 211, 212, 213, . . . may include an image generated by adding the non-defective article image by the second image process including one or more of noise addition, gain adjustment, contrast adjustment, and averaging.

Further, in the example illustrated in FIG. 2, the template image includes a plurality of images 221, 222, 223, . . . . The image 221 is an image including a mask region 221*a* at a position P221 that is predetermined as a position of a defect candidate region in which a defect is generally frequently occurred in the welded portion WP of the article PG imaged in the non-defective article image. Similarly, the images 222 and 223 also images including mask regions 222*a* and 223*a* at positions P222 and P223, which are predetermined as positions where defects generally frequently occur in the welded portions WP of the articles PG respectively imaged in the non-defective article images. It is desirable that the mask regions 221*a*, 222*a*, 223*a*, . . . are set in various positions and sizes so as to cover various defects that may occur in the welded portion WP. As described above, the images 221, 222, 223, . . . may include images generated by adding a certain template image by the first image process including at least expansion or contraction on the mask region.

Further, in the example illustrated in FIG. 2, the non-defective article mask image includes a plurality of images 241, 242, 243, . . . . The image 241 is an image in which the defect candidate region of the non-defective article image, in which the article PG including no defect in the welded portion WP is imaged, is masked by the region 241*a* as the mask region. Although details are omitted in the example illustrated in FIG. 2, similar to the image 241, the images 242 and 243 are also images in which the defect candidate regions of the non-defective article images are masked by the mask regions. The images 241, 242, 243, . . . as the non-defective article mask images are generated by synthesizing, by the image synthesizer 230, an arbitrary combination of any one of the images 211, 212, 213, . . . as non-defective article images and any one of the images 221, 222, 223, . . . as the template images.

In addition, in the example illustrated in FIG. 2, the pseudo-defective article image includes a plurality of images 251, 252, 253, . . . . The image 251 is an image restored from the image 241 by the restorer 121 so that the region 241*a*, which is the mask region included in the image 241 as the non-defective article mask image, is reproduced in a pseudo manner as the region 251*a* that looks like an actual defect. Although details are omitted in the example illustrated in FIG. 2, similar to the image 251, the images 252 and 253 are images restored from the non-defective article mask images by the restorer 121 to be reproduced in a pseudo manner as regions in which the mask regions of the non-defective article mask images look like actual defects.

Figure 3:
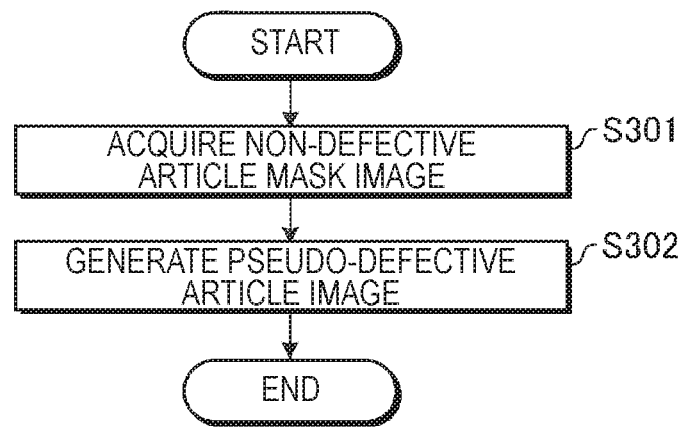
FIG. 3 is an exemplary and schematic flowchart illustrating a series of processes executed by the image restoration apparatus according to an embodiment.

Based on the configuration described above, the image restoration apparatus 100 according to the embodiment generates the pseudo-defective article image according to a flow illustrated in FIG. 3.

FIG. 3 is an exemplary and schematic flow chart illustrating a series of processes executed by the image restoration apparatus 100 according to the embodiment.

As illustrated in FIG. 3, in the embodiment, first, in S301, the image acquisition unit 110 of the image restoration apparatus 100 acquires the non-defective article mask image. As described above, the non-defective article mask image is an image in which the defect candidate region, which is predetermined to correspond to a portion of an article in which a defect frequently occurs in the non-defective article image as an article image in which an article including no defect is imaged, is masked by the mask region. Such a non-defective article mask image is generated by synthesizing the non-defective article image and the template image including the mask region at a predetermined position corresponding to the defect candidate region.

Then, in S302, the image output unit 120 of the image restoration apparatus 100 uses the restorer 121 to generate the pseudo-defective article image that is obtained by reproducing in a pseudo manner the defective article image that is the article image in which an article including a defect is imaged, from the non-defective article mask image acquired in S301. As described above, the restorer 121 is a learned model pre-trained by the machine learning so as to output the pseudo-defective article image according to the input of the non-defective article mask image. Then, the process ends.

As described above, the image restoration apparatus 100 according to the embodiment includes the image acquisition unit 110 and the image output unit 120. The image acquisition unit 110 acquires the mask image which is generated by masking, by the mask region, a predetermined region of the article image in which the article is imaged. Then, the image output unit outputs the restored image corresponding to the mask image acquired by the image acquisition unit 110 by using the restorer 121. The restorer 121 is pre-trained by the machine learning so as to output a restored image, which is restored from the mask image, according to the input of the mask image, to reproduce the article image in a pseudo manner.

More specifically, in the embodiment, the image acquisition unit 110 acquires, as the mask image, the non-defective article mask image generated by masking a predetermined defect candidate region as a predetermined region so as to correspond to a portion of an article in which a defect frequently occurs during manufacturing in the non-defective article image which is the article image in which the article including no defect is imaged. In addition, the restorer 121 is pre-trained by the machine learning based on the defective article image and the defective article mask image, as the mask image, generated by masking, as a predetermined region, the defective region corresponding to the defect in the defective article image so as to output, as a restored image, the pseudo-defective article image which is restored to reproduce the defective article image in a pseudo manner, which is the article image in which the article including the defect is imaged. The image output unit 120 outputs the pseudo-defective article image corresponding to the non-defective article mask image acquired by the image acquisition unit 110 by using the restorer 121.

According to the configuration described above, it is possible to easily mass-produce the restored image, which can be handled in the same manner as the article image, from the mask image generated by the article image and the mask region, by using the restorer 121. Therefore, for example, in a case where learning is executed by using the article image, not only the article image but also the restored image can be used as learning images, so that it is possible to easily increase the number of images that can be used for learning.

More specifically, according to the configuration described above, it is possible to mass-produce the pseudo-defective article image that can be handled in the same manner as defective article image, based on the non-defective article image. Therefore, for example, in a case where learning is executed by using the article image, it is possible to execute the learning with high accuracy by using the non-defective article image, the defective article image, and the pseudo-defective article image.

Here, in the embodiment, the image acquisition unit 110 can increase the number of non-defective article mask images by executing the first image process including at least expansion or contraction on the mask region. According to such a configuration, it is possible to easily increase variation of the non-defective article mask image which is the source of the pseudo-defective article image by the first image process. Therefore, it is possible to easily mass-produce the pseudo-defective article image.

Further, in the embodiment, the image acquisition unit 110 can increase the number of non-defective article mask images by executing the second image process including one or more of noise addition, gain adjustment, contrast adjustment, and averaging on a region other than the mask region in the non-defective article mask image. According to such a configuration, it is possible to easily increase the variation of the non-defective article mask image which is the source of the pseudo-defective article image by the second image process. Therefore, it is possible to easily mass-produce the pseudo-defective article image.

In the embodiment, the image acquisition unit 110 acquires the non-defective article mask image by synthesizing the non-defective article image and the template image including the mask region at a predetermined position. According to such a configuration, it is possible to easily acquire the non-defective article mask image only by synthesizing two types of images.

<Restorer Generation Apparatus>

By the way, in order to appropriately realize the image restoration apparatus 100 as described above, it is important that the accuracy of the restoration of the mask image by the restorer 121 is high. Therefore, in the embodiment, it is realized that the restorer 121 having high accuracy necessary for appropriately realize the image restoration apparatus 100 that can easily increase the number of images usable for the machine learning is obtained by the restorer generation apparatus 400 having functions illustrated in FIG. 4.

Figure 4:
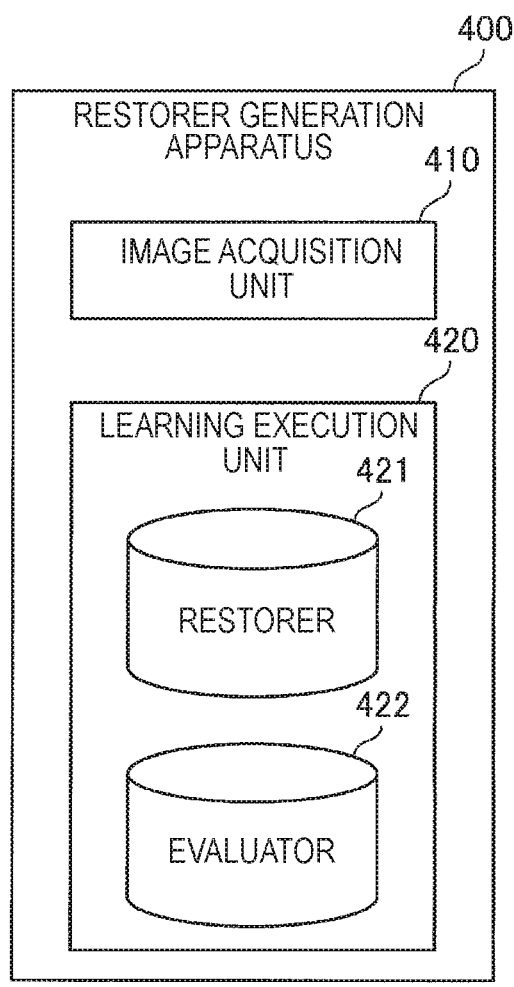
FIG. 4 is an exemplary and schematic block diagram illustrating functions of a restorer generation apparatus according to an embodiment.

FIG. 4 is an exemplary and schematic block diagram illustrating the functions of the restorer generation apparatus 400 according to the embodiment. As illustrated in FIG. 4, the restorer generation apparatus 400 according to the embodiment includes an image acquisition unit 410 and a learning execution unit 420.

The image acquisition unit 410 acquires the mask image generated by masking, by the mask region, a predetermined region of the article image in which the article is imaged. More specifically, the image acquisition unit 110 acquires, as the mask image, the defective article mask image generated by masking, as a predetermined region, a defective region corresponding to the defect in the defective article image that is the article image in which the article including the defect is imaged.

The learning execution unit 420 generates the restorer 421 that has to be the restorer 121 (see FIGS. 1 and 2) described above. More specifically, the learning execution unit 420 executes training by the machine learning based on the mask image acquired by the image acquisition unit 410 and the article image that is the source of the mask image, thereby generating the restorer 421 that outputs the restored image restored from the mask image according to the input of the mask image to reproduce the article image in a pseudo manner.

More specifically, the learning execution unit 420 executes the training by the machine learning based on the defective article mask image acquired by the image acquisition unit 410 and the defective article image which is the source of the defective article mask image, thereby generating the restorer 421 that outputs, as the restored image, the pseudo-defective article image restored from the defective article mask image to reproduce the defective article image in a pseudo manner.

Here, as a specific example will be described later, the learning execution unit 420 executes the training by the machine learning on the restorer 421 so as to reduce a difference in features between the pseudo-defective article image output from the restorer 421 and the defective article image that is the source of the defective article mask image input to the restorer 421 for obtaining an output of the pseudo-defective article image. Thereby, it is possible to proceed the training by the machine learning while receiving a feedback of the difference in features between the restored image that is a restored result by the restorer 421 and the article image as an original data.

The difference in features described above to receive the feedback may be acquired by any method, but in the embodiment, the learning execution unit 420 acquires the difference in features described above to receive the feedback by using an evaluator 422. The evaluator 422 is a learned model that is pre-trained by the machine learning so as to output the difference in features between the pseudo-defective article image and the defective article image according to the input of the both. Such an evaluator 422 can be configured as an aid of an evaluator (classifier) generally used in the field of the machine learning using images.

According to the configuration described above, it is possible to generate the restorer 421 that outputs the pseudo-defective article image with high accuracy by using the defective article image in which a defect actually exists, and use the generated restorer 421 as the restorer 121 (see FIGS. 1 and 2) described above. Therefore, according to the restorer generation apparatus 400 according to the embodiment, it is possible to obtain the restorer 121 with high accuracy required to appropriately realize the image restoration apparatus 100 (see FIG. 1) that can easily increase the number of images usable for the machine learning.

In the embodiment, the image acquisition unit 410 is configured to increase the number of defective article mask images by executing the first image process including at least expansion or contraction on the mask region. Further, the image acquisition unit 110 is configured to increase the number of defective article mask images by executing the second image process including one or more of noise addition, gain adjustment, contrast adjustment, and averaging on a region other than the mask region in the defective article mask image. According to such a configuration, it is possible to easily increase the number of defective article mask images that are images used for the machine learning for generating the restorer 421.

Figure 5:
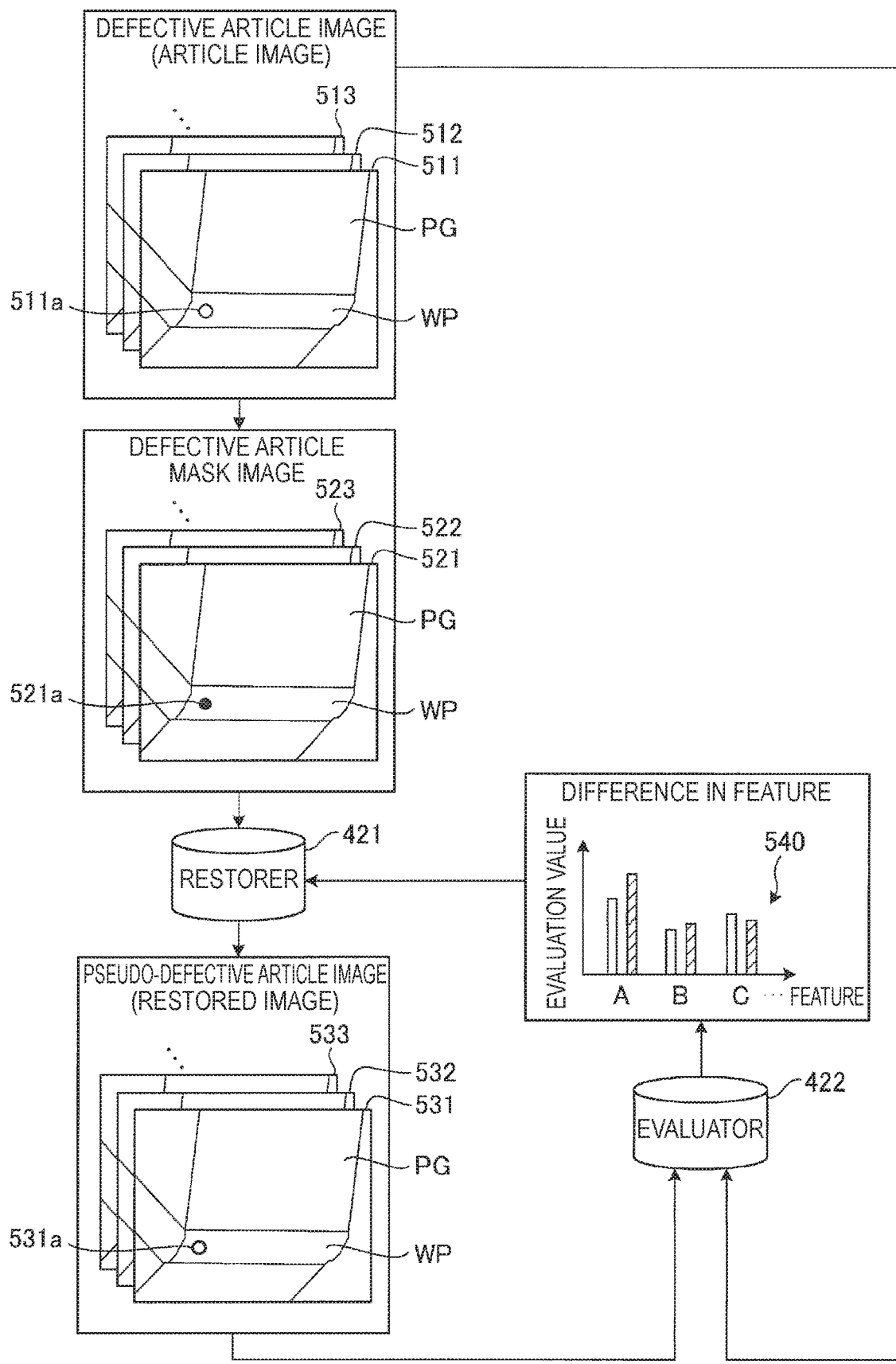
FIG. 5 is an exemplary and schematic diagram for more specifically explaining a training method by machine learning for a restorer according to an embodiment.

FIG. 5 is an exemplary and schematic diagram for more specifically explaining the training method by the machine learning on the restorer 421 according to the embodiment. As briefly described above, as illustrated in FIG. 5, the training by the machine learning on the restorer 421 according to the embodiment is executed by considering the difference in features between the pseudo-defective article image output from the restorer 421 and the defective article image that is the source of the defective article mask image that is input to the restorer 421 to obtain the output of the pseudo-defective article image.

In the example illustrated in FIG. 5, the defective article image which is the source of the defective article mask image input to the restorer 421 includes a plurality of images 511, 512, 513, . . . . The image 511 is an image in which the article PG including a defect 511*a* in the welded portion WP is imaged. Although details are omitted in the example illustrated in FIG. 5, similar to the image 511, the images 512 and 513 are also images in which the article PG including a defect in the welded portion WP is imaged. The article PG imaged in the images 512 and 513 may or may not match the article PG imaged in the image 511. In a case where the article PG imaged in the images 512 and 513, and the article PG imaged in the image 511 match each other, if the imaging manners or types of the defects of the welded portion WP in the respective images are different from each other, it is possible to secure the diversity.

In addition, in the example illustrated in FIG. 5, the defective article mask image includes a plurality of images 521, 522, 523, . . . . The image 221 is an image in which the defective region corresponding to the defect 511*a* imaged in the image 511 as the defective article image is masked by the region 521*a* as the mask region. Although details are omitted in the example illustrated in FIG. 5, similar to the image 521, the images 522 and 523 are also images in which the defective region corresponding to the defect imaged in the defective article image is masked by the mask region. Basically, a size of the mask region is manually set to a size that substantially covers the defect imaged in the defective article image.

Further, in the example illustrated in FIG. 5, the pseudo-defective article image generated by the restorer 421 according to the input of the defective article mask image includes a plurality of images 531, 532, 533, . . . . The image 531 is an image restored from the image 521 by the restorer 421 during the training by the machine learning so that a region 521*a*, which is the mask region included in the image 521 as the defective article mask image, is reproduced in a pseudo manner as a region 531*a* that looks like an actual defect. Although details are omitted in the example illustrated in FIG. 5, similar to the image 531, the images 532 and 533 are also images which are restored from the defective article mask image by the restorer 421 to be reproduced in a pseudo manner as a region in which the mask region included in the defective article mask image looks like an actual defect.

Here, in the embodiment, it is desired to make similar the pseudo-defective article image output from the restorer 421 and the defective article image, which is the source of the defective mask image input to the restorer 421 for obtaining the output of the pseudo-defective article image. Therefore, in the embodiment, as described above, the evaluation of the difference in features between the pseudo-defective article image and the defective article image is executed by using the evaluator 422, which is the learned model that is pre-trained by the machine learning so as to output the difference in features between the both according to the input of the both, and the training is proceeded by the machine learning on the restorer 421 so as to reduce the difference in features between the both while receiving the feedback of the evaluation result.

In the example illustrated in FIG. 5, the evaluation result by the evaluator 422 is obtained as data in a form of bar graphs 540 representing a state where a result in which the pseudo-defective article image and the defective article image are evaluated in a plurality of common features is classified for every feature. In the bar graphs 540 illustrated in FIG. 5, evaluation values regarding features A, B, C, . . . of the pseudo-defective article image and the evaluation values regarding the features A, B, C, . . . of the defective article image are distinguished by presence or absence of hatching. In the example illustrated in FIG. 5, the data output from the evaluator 422 is represented as the bar graphs 540 for the sake of clarity, but in the embodiment, data of any format may be output from the evaluator 422 as long as there is data which knowns the difference in every feature between the pseudo-defective article image and the defective article image.

As described above, in the embodiment, it is possible to increase the accuracy of the restoration by the restorer 421 by proceeding the training by the machine learning on the restorer 421 by using the result of the evaluation by the evaluator 422, and generate the restorer 421 suitable for use as the restorer 121 (see FIGS. 1 and 2) described above.

Further, in the embodiment, as described above, the first image process including at least expansion or contraction can be executed on the mask region of the defective article mask image. As described above, the expansion or contraction of the mask region is effective for adding the defective article mask image. In addition, as illustrated in FIG. 6 below, the expansion or contraction of the mask region is also effective in that the accuracy of the restoration is improved by the restorer 421 by proceeding the training by the machine learning in consideration of information regarding the actual defect more broadly.

Figure 6:
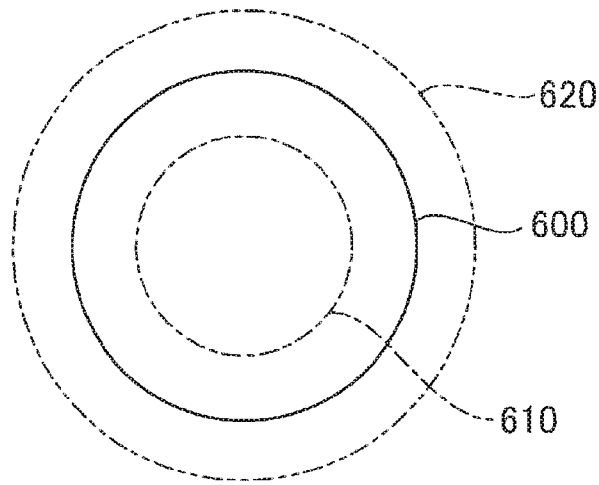
FIG. 6 is an exemplary and schematic diagram for more specifically explaining an effect of expansion or contraction of a mask region that may be executed when generating the restorer according to an embodiment.

FIG. 6 is an exemplary and schematic diagram for more specifically explaining the effect of the expansion or contraction of the mask region that can be executed when the restorer according to the embodiment is generated. In the example illustrated in FIG. 6, a solid line circle 600 corresponds to a basic mask region that serves as a reference of the expansion or contraction, a one-dot chain line circle 610 corresponds to a contracted mask region, and a two-dot chain line circle 620 corresponds to an expanded mask region.

As described above, the size of the mask region is basically manually set to a size that substantially covers the defect imaged in the defective article image. Therefore, the basic mask region indicated by the solid line circle 600 almost covers the actual defect, and from the defective article mask image including the basic mask region, only information on a region outside an almost boundary of the defect is obtained as information on the defect.

On the other hand, the contracted mask region indicated by the one-dot chain line circle 610 is smaller than the basic mask region indicated by the solid line circle 600. Therefore, the contracted mask region indicated by the one-dot chain line circle 610 does not cover the region near an inner edge of the boundary of the actual defect, and from the defective article mask image including the contracted mask region, it is possible to obtain, as the information on the defect, not only the information on the region outside the boundary of the defect but also the information on the region near the inner edge of the boundary of the defect.

In addition, the expanded mask region indicated by the two-dot chain line circle 620 is larger than the basic mask region indicated by the solid line circle 600. Therefore, the expanded mask region indicated by the two-dot chain line circle 620 substantially covers not only the actual defect, but also the region near an outer edge of the boundary of the actual defect, and from the defective article mask image including the expanded mask region, as the information on the defect, information regarding a region further outside than the region near the outer edge of the boundary of the defect can be obtained.

As described above, the expansion or contraction of the mask region can obtain information on the actual defect more broadly. Such a wide range of information is considered to be useful as a basis for reproducing the defect in a pseudo manner, so that if the training by the machine learning is proceeded based on the defective article mask image that is added by the expansion or contraction of the mask region, it is possible to improve the accuracy of the restoration by the restorer 421.

Based on the configuration described above, the restorer generation apparatus 400 according to the embodiment generates the restorer 421 according to a flow illustrated in FIG. 7 below.

Figure 7:
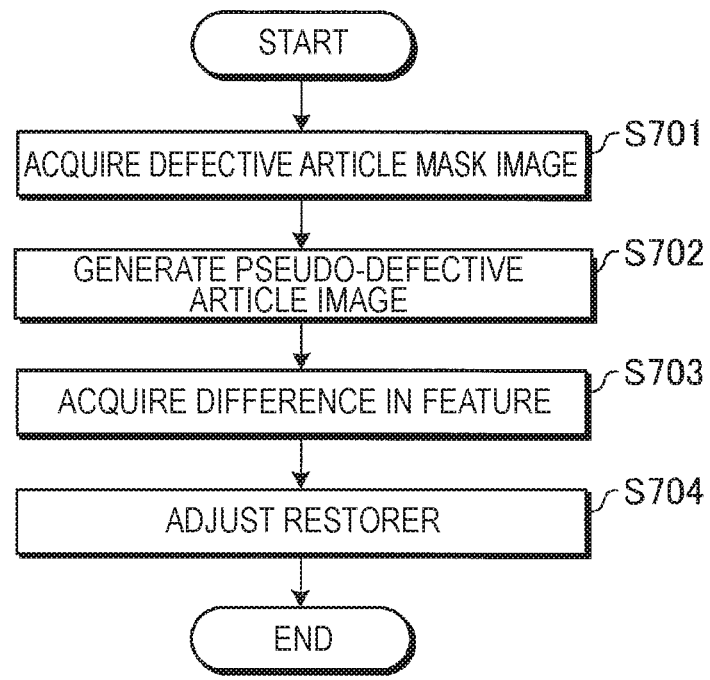
FIG. 7 is an exemplary and schematic flowchart illustrating a series of processes executed by a restorer generation apparatus according to an embodiment.

FIG. 7 is an exemplary and schematic flow chart illustrating a series of processes executed by the restorer generation apparatus 400 according to the embodiment.

As illustrated in FIG. 7, in the embodiment, first, in S701, the image acquisition unit 410 of the restorer generation apparatus 400 acquires the defective article mask image. As described above, the defective article mask image is an image in which the defective region corresponding to the defect in the defective article image is masked by the mask region as the article image in which the article including the defect is imaged.

Then, in S702, the learning execution unit 420 of the restorer generation apparatus 400 generates the pseudo-defective article image, which is obtained by reproducing the defective article image in a pseudo manner by using the restorer 421 from the defective article mask image acquired in S701.

Then, in S703, the learning execution unit 420 of the restorer generation apparatus 400 uses the evaluator 422 to acquire a difference in features between the pseudo-defective article image output from the restorer 421 in S702 and the defective article image that is the source of the defective article mask image input to the restorer 421 in S702 for obtaining the output of the pseudo-defective article image.

Then, in S704, the learning execution unit 420 of the restorer generation apparatus 400 proceeds the training by the machine learning on the restorer 421 while receiving the feedback of the difference in features acquired in S703, thereby adjusting the restorer 421 so as to output the pseudo-defective article image close to the defective article image which is the source of the defective article mask image according to the input of the defective article mask image. Then, the process ends.

The restorer generation apparatus 400 according to the embodiment repeatedly executes a series of processes of S701 to S704 to increase the accuracy of restoration by the restorer 421, and generates the restorer 421 suitable for the use as the restorer 121 (see FIGS. 1 and 2) described above.

As described above, the restorer generation apparatus 400 according to the embodiment includes the image acquisition unit 410 and the learning execution unit 420. The image acquisition unit 410 acquires the mask image generated by masking, by the mask region, a predetermined region of the article image in which the article is imaged. In addition, the learning execution unit 420 executes the training by the machine learning based on the mask image acquired by the image acquisition unit 410 and the article image that is the source of the mask image, thereby generating the restorer 421 which outputs the restored image restored from the mask image according to the input of the mask image to reproduce the article image in a pseudo manner.

More specifically, in the embodiment, the image acquisition unit 410 masks, as a predetermined region, the defective region corresponding to the defect in the defective article image, which is the article image in which the article including the defect is imaged, thereby acquiring the generated defective article mask image as the mask image. Then, the learning execution unit 420 executes the training by the machine learning based on the defective article mask image acquired by the image acquisition unit 410 and the defective article image that is the source of the defective article mask image, thereby generating the restorer 421 that outputs, as the restored image, the pseudo-defective article image that is restored to reproduce the defective article image in a pseudo manner as the article image.

With the configuration described above, it is possible to generate the restorer 421 capable of easily mass-producing the restored images that can be handled in the same manner as the article images. More specifically, it is possible to generate the restorer 421 suitable for the image restoration apparatus 100 (see FIG. 1) capable of mass-producing the pseudo-defective article image that can be handled in the same manner as the defective article image. Therefore, for example, in a case where the learning is executed by using the article image, it is possible to generate the restorer 421 suitable for the image restoration apparatus 100 (see FIG. 1) capable of easily increasing the number of images that can be used for the learning.

Here, in the embodiment, the learning execution unit 420 executes the training by the machine learning on the restorer 421 so as to reduce the difference in features between the pseudo-defective article image output from the restorer 421 and the defective article image that is the source of the defective article mask image input to the restorer 421 for obtaining the output of the pseudo-defective article image. According to such a configuration, it is possible to improve the accuracy of the restoration by the restorer 421 while receiving the feedback of the difference in features between the two images.

More specifically, the learning execution unit 420 acquires the difference in features between the pseudo-defective article image output from the restorer 421 and the defective article image that is the source of the defective article mask image input to the restorer 421 to obtain the output of the pseudo-defective article image by using the evaluator 422 pre-trained by the machine learning so as to output the difference in features between the both according to the input of the both. According to such a configuration, it is possible to easily acquire the difference in features between the both images by using the evaluator 422.

In the embodiment, the image acquisition unit 410 can increase the number of defective article mask images by executing the first image process including at least expansion or contraction on the mask region. According to such a configuration, it is possible to easily increase the variation of the defective article mask image that is the source of the pseudo-defective article image by the first image process. Therefore, since the training by the machine learning on the restorer 421 can be executed based on a lot of data, it is possible to improve the accuracy of the restoration by the restorer 421.

In addition, in the embodiment, the image acquisition unit 410 executes the second image process including one or more of noise addition, gain adjustment, contrast adjustment, and averaging on a region other than the mask region in the mask image, thereby increasing the number of defective article mask images. According to such a configuration, it is possible to easily increase the variation of the defective article mask image that is the source of the pseudo-defective article image by the second image process. Therefore, since the training by the machine learning on the restorer 421 can be executed based on a lot of data, it is possible to improve the accuracy of the restoration by the restorer 421.

<Determiner Generation Apparatus>

As described above, the pseudo-defective article image generated by the restorer 121 (see FIGS. 1 and 2) as the restorer 421 (see FIGS. 4 and 5), in which training is completed by the machine learning, can be used for the machine learning to generate the learned model for determining the presence or absence of the defect of the article. In the embodiment, a determiner generation apparatus 800 having functions as illustrated in FIG. 8 below generates a determiner 821 that is a learned model for determining the presence or absence of the defect in the article.

Figure 8:
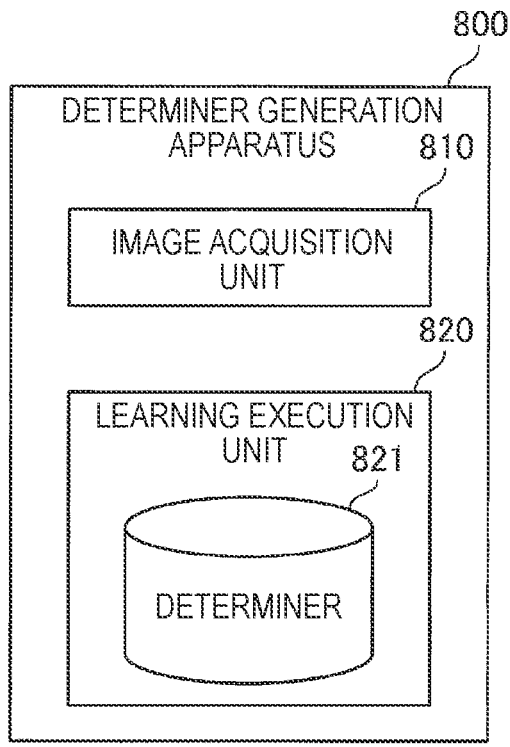
FIG. 8 is an exemplary and schematic block diagram illustrating functions of a determiner generation apparatus according to an embodiment.

FIG. 8 is an exemplary and schematic block diagram illustrating the functions of the determiner generation apparatus 800 according to the embodiment. As illustrated in FIG. 8, the determiner generation apparatus 800 according to the embodiment includes an image acquisition unit 810 and a learning execution unit 820.

The image acquisition unit 410 acquires a learning image used for the training by the machine learning on the determiner 821. The learning image includes the non-defective article image, the defective article image, and the pseudo-defective article image. What kinds of images the non-defective article image, the defective article image, and the pseudo-defective article image are have already been described, and therefore, the description thereof is omitted here. The image acquisition unit 410 acquires a large amount of the non-defective article image, the defective article image, and the pseudo-defective article image, respectively.

The learning execution unit 420 executes the training by the machine learning based on the learning image acquired by the image acquisition unit 410, and allows the determiner 821 to learn a correspondence relationship between the learning image (feature thereof) and a determination result regarding the article imaged in the learning image. More specifically, the learning execution unit 420 executes the training by the machine learning on the determiner 821 by a method illustrated in FIG. 9 below.

Figure 9:
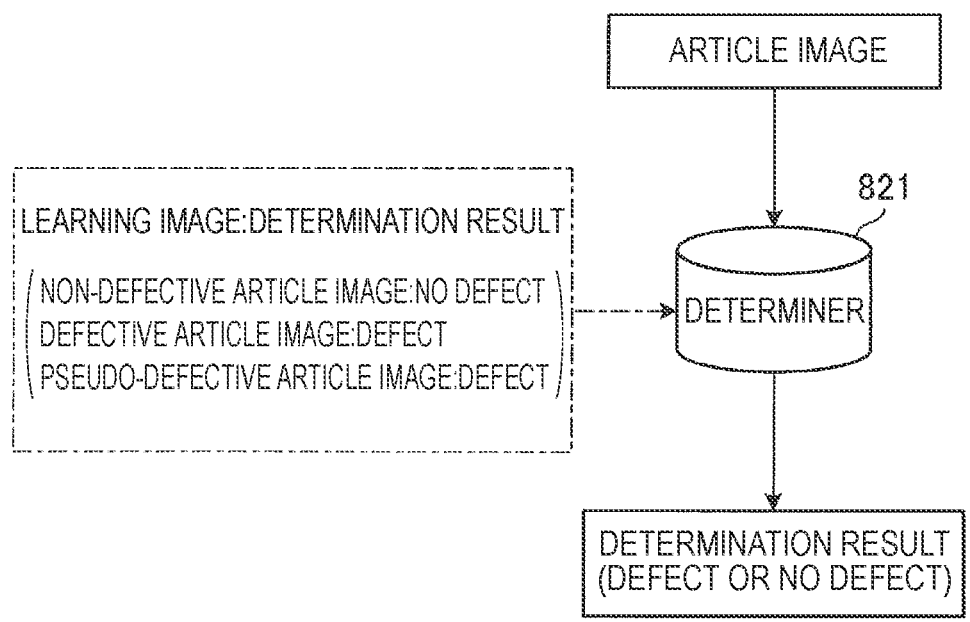
FIG. 9 is an exemplary and schematic diagram illustrating a training method by machine learning for a determiner according to an embodiment.

FIG. 9 is an exemplary and schematic diagram for explaining a training method by machine learning on the determiner 821 according to the embodiment.

As illustrated in FIG. 9, the learning execution unit 420 allows the determiner 821 to learn a correspondence relationship between the non-defective article image (feature thereof) as the learning image and a determination result that the article imaged in the non-defective article image does not include the defect, a correspondence relationship between the defective article image (feature thereof) as the learning image and a determination result that the article imaged in the defective article image includes the defect, and a correspondence relationship between the pseudo-defective article image (feature thereof) as the learning image and a determination result that the article imaged in the pseudo-defective article image includes the defect. Thereby, the learning execution unit 420 generates the determiner 821 capable of outputting the determination result regarding the presence or absence of the defect of the article imaged in the article image even in a case where an unknown article image is input.

Based on the configuration described above, the determiner generation apparatus 800 according to the embodiment generates the determiner 821 according to the flow illustrated in FIG. 10 below.

Figure 10:
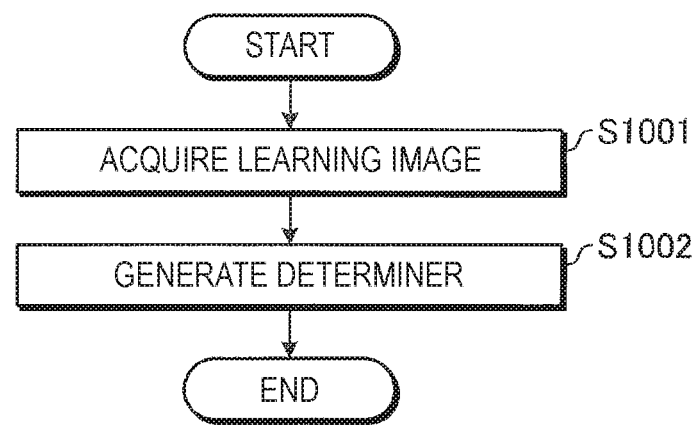
FIG. 10 is an exemplary and schematic flowchart illustrating a series of processes executed by the determiner generation apparatus according to the embodiment.

FIG. 10 is an exemplary and schematic flow chart illustrating a series of processes executed by the determiner generation apparatus 800 according to the embodiment.

As illustrated in FIG. 10, in the embodiment, first, in S1001, the image acquisition unit 810 of the determiner generation apparatus 800 acquires the learning image including the non-defective article image, the defective article image, and the pseudo-defective article image.

Then, in S1002, the learning execution unit 820 of the determiner generation apparatus 800 executes the training by the machine learning on the determiner 821 so as to learn the correspondence relationship between the learning image (feature thereof) acquired in S1001 and the determination result regarding the presence or absence of the defect of the article imaged in the learning image, and generates the determiner 821 capable of outputting the determination result regarding the presence or absence of the defect of the article imaged in the article image, even in a case where an unknown article image is input. Then, the process ends.

As described above, the determiner generation apparatus 800 according to the embodiment includes the image acquisition unit 810 and the learning execution unit 820. The image acquisition unit 810 acquires the learning image including the restored image obtained by using the restorer 121 (see FIGS. 1 and 2) as the restorer 421 (see FIGS. 4 and 5) in which the training is completed by the machine learning as described above, and the article image. The learning execution unit 820 executes the training by the machine learning based on the learning image acquired by the image acquisition unit 810, and generates the determiner 821 that outputs a determination result regarding the article imaged in the article image according to the input of the article image.

According to the determiner generation apparatus described above, for example, unlike a case where the training by the machine learning is executed on the determiner 821 using only the article images, it is possible to improve the accuracy of training by machine learning on the determiner 821 by using a large number of learning images including restored images and article images which are mass-produced. Therefore, it is possible to generate the determiner 821 capable of obtaining the determination result with high accuracy regarding the article imaged in the article image.

<Article Determination Apparatus>

As described above, the determiner 821 (see FIGS. 8 and 9) in which the training is completed by the machine learning can be used for determination of the presence or absence of the defect of the article. In the embodiment, the presence or absence of the defect of the article is determined by an article determination apparatus 1100 having functions as illustrated in FIG. 11 below.

Figure 11:
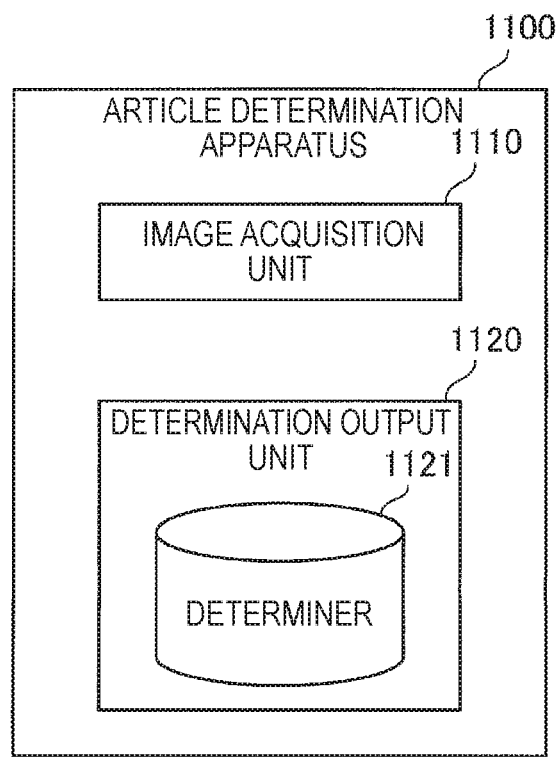
FIG. 11 is an exemplary and schematic block diagram illustrating functions of an article determination apparatus according to an embodiment.

FIG. 11 is an exemplary and schematic block diagram illustrating the functions of the article determination apparatus 1100 according to the embodiment. As illustrated in FIG. 11, the article determination apparatus 1100 according to the embodiment includes an image acquisition unit 1110 and a determination output unit 1120.

The image acquisition unit 1110 acquires the article image in which the article is imaged. The article image is obtained, for example, by imaging, by an imaging apparatus, an article after being processed by a processing apparatus or the like.

The determination output unit 1120 uses a determiner 1121 to output the determination result regarding the article imaged in the article image acquired by the image acquisition unit 1110. The determiner 1121 is the determiner 821 (see FIGS. 8 and 9) described above in which the training is completed by the machine learning. Therefore, the determiner 1121 outputs the determination result regarding the presence or absence of the defect of the article imaged in the article image according to the input of the article image acquired by the image acquisition unit 1110.

Figure 12:
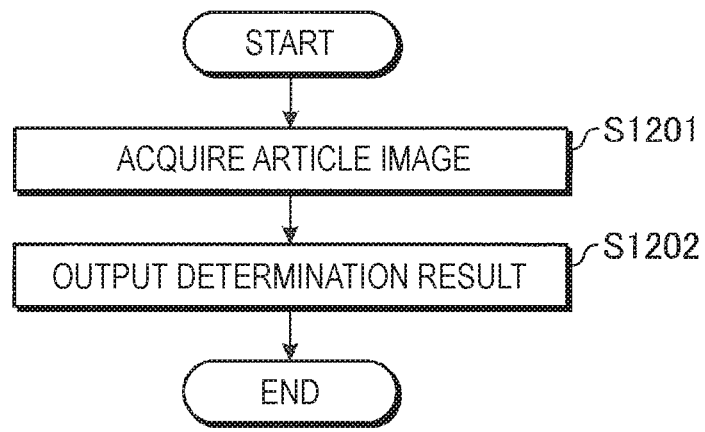
FIG. 12 is an exemplary and schematic flowchart illustrating a series of processes executed by the article determination apparatus according to the embodiment.

Based on the configuration described above, the article determination apparatus 1100 according to the embodiment outputs the determination result regarding the presence or absence of the defect of the article in a flow illustrated in FIG. 12.

FIG. 12 is an exemplary and schematic flow chart illustrating a series of processes executed by the article determination apparatus according to the embodiment.

As illustrated in FIG. 12, in the embodiment, first, in S1201, the image acquisition unit 1110 of the article determination apparatus 1100 acquires the article image in which the article is imaged.

Then, in S1202, the determination output unit 1120 of the article determination apparatus 1100 uses the determiner 1121 to output the determination result regarding the presence or absence of the defect of the article imaged in the article image acquired in S1201. Then, the process ends.

As described above, the article determination apparatus 1100 according to the embodiment includes the image acquisition unit 1110 and the determination output unit 1120. The image acquisition unit 1110 acquires the article image in which the article is imaged. The determination output unit 1120 uses the determiner 1121 as the determiner 821 (see FIGS. 8 and 9) in which the training is completed by the machine learning as described above, to output the determination result regarding the article imaged in the article image acquired by the image acquisition unit 1110.

According to the configuration described above, it is possible to obtain the determination result with high accuracy regarding the article imaged in the article image by using the determiner 1121 pre-trained so as to obtain the determination result with high accuracy by the machine learning by using a large number of learning images including the restored images and the article images which are mass-produced.

<Hardware Configuration for Realizing Functions of Embodiment>

Figure 13:
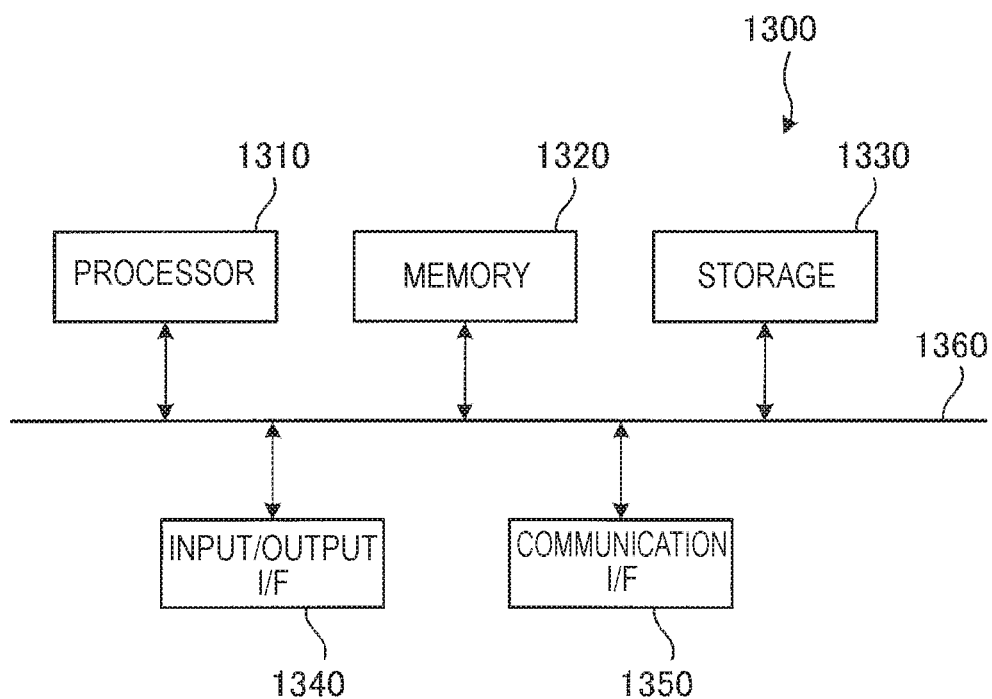
FIG. 13 is an exemplary and schematic diagram illustrating a hardware configuration of an information processing apparatus for realizing the image restoration apparatus, the restorer generation apparatus, the determiner generation apparatus, and the article determination apparatus according to the embodiments.

Any of the functions of the embodiments described above illustrated in FIGS. 1, 4, 8, and 11 can be realized by an information processing apparatus 1300 including the same hardware resources as those of a normal computer as illustrated in FIG. 13 below.

FIG. 13 is an exemplary and schematic diagram illustrating a hardware configuration of the information processing apparatus 1300 for realizing the image restoration apparatus 100 (see FIG. 1), the restorer generation apparatus 400 (see FIG. 4), the determiner generation apparatus 800 (see FIG. 8), and the article determination apparatus 1100 (see FIG. 11) according to the embodiments.

As illustrated in FIG. 13, the information processing apparatus 1300 according to the embodiment has a processor 1310, a memory 1320, a storage 1330, an input/output interface (I/F) 1340, and a communication interface (I/F) 1350. These pieces of hardware are connected to a bus 1360.

Processor 1310 is configured as, for example, a central processing unit (CPU), and centrally controls an operation of each unit of the information processing apparatus 1300. The memory 1320 includes, for example, a read only memory (ROM) and a random access memory (RAM), and realizes a volatile or nonvolatile storage of various data such as a program executed by the processor 1310, and providing a work region for executing a program by the processor 1310.

The storage 1330 includes, for example, a hard disk drive (HDD) or a solid state drive (SSD), and stores various data in a non-volatile manner. The input/output interface 1340 controls an input of data to the information processing apparatus 1300 and an output of data from the information processing apparatus 1300. The communication interface 1350 enables the information processing apparatus 1300 to communicate with another apparatus via a network such as the Internet.

The image restoration apparatus 100 (see FIG. 1) described above is functionally realized as a result of executing an image restoration program stored in the memory 1320 or the storage 1330 by the processor 1310. Similarly, in the restorer generation apparatus 400 (see FIG. 4), the determiner generation apparatus 800 (see FIG. 8), and the article determination apparatus 1100 (see FIG. 11) described above are respectively functionally realized as a result of executing a restorer generation program, a determiner generation program, and an article determination program by the processor 1310. However, in the embodiment, at least some of the functions realized by the image restoration apparatus 100, the restorer generation apparatus 400, the determiner generation apparatus 800, and the article determination apparatus 1100 described above may be realized as dedicated hardware (circuit).

Various programs executed in the information processing apparatus 1300 according to the embodiment may be provided in a state of being pre-installed in a storage device such as the memory 1320 and the storage 1330, or may be provided in a computer program product which is recorded in a form that is installable or executable on a computer-readable non-transitory storage medium such as various magnetic disks such as flexible disk (FD), and various optical disks such as a digital versatile disk (DVD).

The various programs executed in the embodiment may be provided or distributed via a network such as the Internet. That is, various programs executed in the embodiment may be provided in a form of being downloaded from a computer via a network in a state of being stored in the computer connected to a network such as the Internet. Furthermore, various learned models used in the embodiments may be provided or distributed via a network such as the Internet as well.

An image restoration apparatus as an example of the present disclosure includes: an image acquisition unit that acquires a mask image generated by masking, by a mask region, a predetermined region of an article image in which an article is imaged; and an image output unit that outputs a restored image corresponding to the mask image acquired by the image acquisition unit by using a restorer pre-trained by machine learning so as to output the restored image, which is restored from the mask image to reproduce the article image in a pseudo manner, according to an input of the mask image.

According to the image restoration apparatus described above, it is possible to easily mass-produce the restored image that can be handled in the same manner as the article image from the mask image generated by the article image and the mask region by using the restorer. Therefore, for example, in a case where learning is executed by using the article image, not only the article image but also the restored image can be used as learning images, so that it is possible to easily increase the number of images that can be used for learning.

In the image restoration apparatus described above, the image acquisition unit may acquire, as the mask image, a non-defective article mask image generated by masking, as the predetermined region, a defect candidate region, which is predetermined so as to correspond to a portion of the article in which a defect frequently occurs during manufacturing, in a non-defective article image that is the article image in which the article including no defect is imaged. The image output unit may output a pseudo-defective article image corresponding to the non-defective article mask image acquired by the image acquisition unit by using the restorer, which is pre-trained by the machine learning based on a defective article image, which is the article image in which the article including the defect is imaged, and a defective article mask image as the mask image generated by masking a defective region, as the predetermined region, corresponding to the defect in the defective article image so as to output, as the restored image, the pseudo-defective article image, which is restored to reproduce the defective article image in a pseudo manner. According to such a configuration, it is possible to mass-produce pseudo-defective article images that can be handled in the same manner as the defective article images based on the non-defective article images. Therefore, for example, in a case where learning is executed by using the article image, it is possible to execute the learning with high accuracy by using the non-defective article image, the defective article image, and the pseudo-defective article image.

In addition, in the image restoration apparatus described above, the image acquisition unit may increase the number of the mask images by executing a first image process including at least expansion or contraction on the mask region. According to such a configuration, it is possible to easily increase variation of the mask image that is the source of the restored image by the first image process. Therefore, it is possible to easily mass-produce the restored images.

Further, in the image restoration apparatus described above, the image acquisition unit may increase the number of the mask images by executing a second image process including one or more of noise addition, gain adjustment, contrast adjustment, and averaging on a region other than the mask region in the mask image. According to such a configuration, it is possible to easily increase the variation of the mask image that is the source of the restored image by the second image process. Therefore, it is possible to easily mass-produce the restored images.

Further, in the image restoration apparatus described above, the image acquisition unit may acquire the mask image by synthesizing the article image and a template image including the mask region at a predetermined position. According to such a configuration, it is possible to easily acquire the mask image only by synthesizing two types of images.

An image restoration method as another example of the present disclosure includes: an image acquisition step of acquiring a mask image generated by masking, by a mask region, a predetermined region of an article image in which an article is imaged; and an image output step of outputting a restored image corresponding to the mask image acquired by the image acquisition step by using a restorer pre-trained by machine learning so as to output the restored image, which is restored from the mask image, according to an input of the mask image to reproduce the article image in a pseudo manner.

According to the image restoration method described above, it is possible to easily mass-produce the restored images that can be handled in the same manner as the article image from the mask image generated by the article image and the mask region by using the restorer. Therefore, for example, in a case where learning is executed by using the article image, not only the article image but also the restored image can be used as learning images, so that it is possible to easily increase the number of images that can be used for learning.

A non-transitory computer readable storage medium as still another example of the present disclosure stores an image restoration program for causing a computer to execute: an image acquisition step of acquiring a mask image generated by masking, by a mask region, a predetermined region of an article image in which an article is imaged; and an image output step of outputting a restored image corresponding to the mask image acquired by the image acquisition step by using a restorer pre-trained by machine learning so as to output the restored image, which is restored from the mask image, according to an input of the mask image to reproduce the article image in a pseudo manner.

According to the image restoration program described above, it is possible to easily mass-produce the restored images that can be handled in the same manner as the article image from the mask image generated by the article image and the mask region by using the restorer. Therefore, for example, in a case where learning is executed by using the article image, not only the article image but also the restored image can be used as learning images, so that it is possible to easily increase the number of images that can be used for learning.

A restorer generation apparatus as still another example of the present disclosure includes: an image acquisition unit that acquires a mask image generated by masking, by a mask region, a predetermined region of an article image in which an article is imaged; and a learning execution unit that generates a restorer that outputs a restored image, which is restored from the mask image, according to an input of the mask image, to reproduce the article image in a pseudo manner by executing training by machine learning based on the mask image acquired by the image acquisition unit and the article image that is a source of the mask image.

According to the restorer generation apparatus, it is possible to generate the restorer capable of easily mass-producing the restored image that can be handled in the same manner as the article image. Therefore, for example, in a case where learning using the article image is executed, it is possible to generate the image restoration apparatus, the image restoration method, and the restorer suitable for the image restoration program capable of easily increasing the number of images usable for the learning.

In the restorer generation apparatus described above, the image acquisition unit may acquire, as the mask image, a defective article mask image generated by masking, as the predetermined region, a defective region corresponding to a defect in a defective article image that is the article image in which the article including the defect is imaged. The learning execution unit may generate the restorer that outputs, as the restored image, a pseudo-defective article image that is restored to reproduce the defective article image as the article image in a pseudo manner by executing training by the machine learning based on the defective article mask image acquired by the image acquisition unit and the defective article image that is the source of the defective article mask image. According to such a configuration, it is possible to generate the image restoration apparatus, the image restoration method, and the restorer suitable for the image restoration program capable of mass-producing the pseudo-defective article image that can be handled in the same manner as the defective article image.

In addition, in the restorer generation apparatus described above, the learning execution unit may execute the training by the machine learning on the restorer to reduce a difference in features between the restored image that is output from the restorer and the article image that is the source of the mask image input to the restorer to obtain an output of the restored image. According to such a configuration, it is possible to improve accuracy of the restoration by the restorer while receiving a feedback of the difference in features between the two images.

In this case, the learning execution unit may acquire the difference in features by using an evaluator that is pre-trained by machine learning so as to output the difference in features according to an input of the restored image output from the restorer and the article image that is the source of the mask image input to the restorer to obtain the output of the restored image. According to such a configuration, it is possible to easily acquire the difference in features of the two images by using the evaluator.

In the restorer generation apparatus described above, the image acquisition unit may increase the number of the mask images by executing a first image process including at least expansion or contraction on the mask region. According to such a configuration, it is possible to easily increase variation of the mask image that is the source of the restored image by the first image process. Therefore, since it is possible to execute the training by the machine learning on the restorer based on a lot of data, it is possible to improve the accuracy of the restore by the restorer.

In addition, in the restorer generation apparatus described above, the image acquisition unit may increase the number of the mask images by executing a second image process including one or more of noise addition, gain adjustment, contrast adjustment, and averaging on a region other than the mask region in the mask image. According to such a configuration, it is possible to easily increase the variation of the mask image that is the source of the restored image by the second image process. Therefore, since it is possible to execute the training by the machine learning on the restorer based on a lot of data, it is possible to improve the accuracy of the restore by the restorer.

A restorer generation method as still another example of the present disclosure includes: an image acquisition step of acquiring a mask image generated by masking, by a mask region, a predetermined region of an article image in which an article is imaged; and a learning execution step of generating a restorer that outputs a restored image, which is restored from the mask image, according to an input of the mask image, to reproduce the article image in a pseudo manner by executing training by machine learning based on the mask image that is acquired by the image acquisition step and the article image that is a source of the mask image.

According to the restorer generation method, it is possible to generate the restorer capable of easily mass-producing the restored image that can be handled in the same manner as the article image. Therefore, for example, in a case where learning using the article image is executed, it is possible to generate the image restoration apparatus, the image restoration method, and the restorer suitable for the image restoration program capable of easily increasing the number of images usable for the learning.

A non-transitory computer readable storage medium as still another example of the present disclosure stores a restorer generation program for causing a computer to execute: an image acquisition step of acquiring a mask image generated by masking, by a mask region, a predetermined region of an article image in which an article is imaged; and a learning execution step of generating a restorer that outputs a restored image, which is restored from the mask image, according to an input of the mask image, to reproduce the article image in a pseudo manner by executing training by machine learning based on the mask image that is acquired by the image acquisition step and the article image that is a source of the mask image.

According to the restorer generation program described above, it is possible to generate the restorer capable of easily mass-producing the restored image that can be handled in the same manner as the article image. Therefore, for example, in a case where learning using the article image is executed, it is possible to generate the image restoration apparatus, the image restoration method, and the restorer suitable for the image restoration program capable of easily increasing the number of images usable for the learning.

A determiner generation apparatus as still another example of the present disclosure includes: an image acquisition unit that acquires a learning image including a restored image and an article image, the restored image being obtained by using a restorer pre-trained by machine learning so as to output the restored image restored from a mask image to reproduce the article image in a pseudo manner according to an input of the mask image generated by masking, by a mask region, a predetermined region of the article image in which an article is imaged; and a learning execution unit that executes training by machine learning based on the learning image acquired by the image acquisition unit, and generates a determiner that outputs a determination result regarding the article imaged in the article image according to an input of the article image.

According to the determiner generation apparatus described above, for example, unlike a case where training is executed by the machine learning on the determiner by using only the article image, it is possible to improve the accuracy of the training by the machine learning on the determiner by using a large number of learning images including the restored images mass-produced by the restorer and the article images. Therefore, it is possible to generate the determiner capable of obtaining a determination result with high accuracy regarding the article imaged in the article image.

A determiner generation method as still another example of the present disclosure includes: an image acquisition step of acquiring a learning image including a restored image and an article image, the restored image being obtained by using a restorer pre-trained by machine learning so as to output the restored image restored from a mask image to reproduce the article image in a pseudo manner according to an input of the mask image generated by masking, by a mask region, a predetermined region of the article image in which an article is imaged; and a learning execution step of executing training by machine learning based on the learning image acquired by the image acquisition step, and generating a determiner that outputs a determination result regarding the article imaged in the article image according to an input of the article image.

According to the determiner generation method described above, for example, unlike a case where training is executed by machine learning on the determiner by using only the article image, it is possible to improve the accuracy of the training by the machine learning on the determiner by using a large number of learning images including the restored images mass-produced by the restorer and the article images. Therefore, it is possible to generate the determiner capable of obtaining a determination result with high accuracy regarding the article imaged in the article image.

A non-transitory computer readable storage medium as still another example of the present disclosure stores a determiner generation program for causing a computer to execute: an image acquisition step of acquiring a learning image including a restored image obtained by using a restorer pre-trained by machine learning and an article image, so as to output the restored image restored from a mask image to reproduce the article image in a pseudo manner according to an input of the mask image generated by masking, by a mask region, a predetermined region of the article image in which an article is imaged; and a learning execution step of executing training by machine learning based on the learning image acquired by the image acquisition step, and generating a determiner that outputs a determination result regarding the article imaged in the article image according to an input of the article image.

According to the above-described determiner generation program, for example, unlike a case where training is executed by the machine learning on the determiner by using only the article image, it is possible to improve the accuracy of the training by the machine learning on the determiner by using a large number of learning images including the restored images mass-produced by the restorer and the article images. Therefore, it is possible to generate the determiner capable of obtaining a determination result with high accuracy regarding the article imaged in the article image.

An article determination apparatus as still another example of the present disclosure includes: an image acquisition unit that acquires an article image in which an article is imaged; and a determination output unit that outputs a determination result regarding the article imaged in the article image acquired by the image acquisition unit by using a determiner pre-trained so as to output the determination result regarding the article which is imaged in the article image according to an input of the article image by machine learning based on a learning image including a restored image obtained by using a restorer pre-trained by machine learning and the article image, so as to output the restored image, which is restored from a mask image, to reproduce the article image in a pseudo manner according to an input of the mask image generated by masking, by a mask region, a predetermined region of the article image.

According to the article determination apparatus, it is possible to obtain a determination result with high accuracy regarding the article imaged in the article image by using the determiner that is pre-trained, so that the determination result with high accuracy is obtained by the machine learning using a large number of learning images including the restored images mass-produced by the restorer and the article images.

An article determination method as still another example of the present disclosure includes: an image acquisition step of acquiring an article image in which an article is imaged; and a determination output step of outputting a determination result regarding the article imaged in the article image acquired by the image acquisition step by using a determiner pre-trained so as to output the determination result regarding the article which is imaged in the article image according to an input of the article image by machine learning based on a learning image including a restored image obtained by using a restorer pre-trained by machine learning and the article image, so as to output the restored image, which is restored from a mask image, to reproduce the article image in a pseudo manner according to an input of the mask image generated by masking, by a mask region, a predetermined region of the article image.

According to the article determination method described above, it is possible to obtain a determination result with high accuracy regarding the article imaged in the article image by using the determiner that is pre-trained, so that the determination result with high accuracy is obtained by the machine learning using a large number of learning images including the restored images mass-produced by the restorer and the article images.

A non-transitory computer readable storage medium as still another example of the present disclosure stores an article determination program for causing a computer to execute: an image acquisition step of acquiring an article image in which an article is imaged; and a determination output step of outputting a determination result regarding the article imaged in the article image acquired by the image acquisition step by using a determiner pre-trained so as to output the determination result regarding the article which is imaged in the article image according to an input of the article image by machine learning based on a learning image including a restored image obtained by using a restorer pre-trained by machine learning and an article image, so as to output a restored image, which is restored from the mask image, to reproduce the article image in a pseudo manner according to an input of the mask image generated by masking, by a mask region, a predetermined region of the article image.

According to the article determination program, it is possible to obtain a determination result with high accuracy regarding the article imaged in the article image by using the determiner that is pre-trained, so that the determination result with high accuracy is obtained by the machine learning using a large number of learning images including the restored images mass-produced by the restorer and the article images.

Although the embodiments of the present disclosure are described above, the embodiments described above are merely examples, and are not intended to limit the scope of the present disclosure. The novel embodiments described above can be implemented in various forms, and various omissions, replacements, and changes can be made without departing from the spirit of the disclosure. The embodiments described above and modifications thereof are included in the scope and the gist of the present disclosure, and are also included in the disclosure described in the claims and the scope equivalent thereto.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An image restoration apparatus comprising:
a processor and/or hardware circuitry configured to implement:
an image acquisition unit that acquires a mask image generated by masking, by a mask region, a predetermined region of an article image in which an article is imaged; and
an image output unit that outputs a restored image corresponding to the mask image acquired by the image acquisition unit by using a restorer pre-trained by machine learning so as to output the restored image, which is restored from the mask image to reproduce the article image in a pseudo manner, according to an input of the mask image.

2. The image restoration apparatus according to claim 1, wherein
the image acquisition unit acquires, as the mask image, a non-defective article mask image generated by masking, as the predetermined region, a defect candidate region, which is predetermined so as to correspond to a portion of the article in which a defect frequently occurs during manufacturing, in a non-defective article image that is the article image in which the article including no defect is imaged, and
the image output unit outputs a pseudo-defective article image corresponding to the non-defective article mask image acquired by the image acquisition unit by using the restorer, which is pre-trained by the machine learning based on a defective article image, which is the article image in which the article including the defect is imaged, and a defective article mask image as the mask image generated by masking a defective region, as the predetermined region, corresponding to the defect in the defective article image so as to output, as the restored image, the pseudo-defective article image, which is restored to reproduce the defective article image in a pseudo manner.

3. The image restoration apparatus according to claim 1, wherein
the image acquisition unit increases the number of the mask images by executing a first image process including at least expansion or contraction on the mask region.

4. The image restoration apparatus according to claim 1, wherein
the image acquisition unit increases the number of the mask images by executing a second image process including one or more of noise addition, gain adjustment, contrast adjustment, and averaging on a region other than the mask region in the mask image.

5. The image restoration apparatus according to claim 1, wherein
the image acquisition unit acquires the mask image by synthesizing the article image and a template image including the mask region at a predetermined position.

6. An image restoration method comprising:
an image acquisition step of acquiring a mask image generated by masking, by a mask region, a predetermined region of an article image in which an article is imaged; and
an image output step of outputting a restored image corresponding to the mask image acquired by the image acquisition step by using a restorer pre-trained by machine learning so as to output the restored image, which is restored from the mask image, according to an input of the mask image to reproduce the article image in a pseudo manner.

7. A non-transitory computer readable storage medium storing an image restoration program for causing a computer to execute:
an image acquisition step of acquiring a mask image generated by masking, by a mask region, a predetermined region of an article image in which an article is imaged; and
an image output step of outputting a restored image corresponding to the mask image acquired by the image acquisition step by using a restorer pre-trained by machine learning so as to output the restored image, which is restored from the mask image, according to an input of the mask image to reproduce the article image in a pseudo manner.

* * * * *